O. W. DAVIS.
CHURN.

No. 190,199. Patented May 1, 1877.

Witnesses:

Inventor:
Oliver W Davis.

UNITED STATES PATENT OFFICE.

OLIVER W. DAVIS, OF WATERBURY, VERMONT.

IMPROVEMENT IN CHURNS.

Specification forming part of Letters Patent No. 190,199, dated May 1, 1877; application filed October 30, 1876.

*To all whom it may concern:*

Be it known that I, OLIVER W. DAVIS, of Waterbury, in the county of Washington and State of Vermont, have invented a new and useful Improvement in Churns, which improvement is set forth in the following specification, reference being had to the accompanying drawings.

The object of my invention is to churn the cream evenly and without breaking the grain of the butter, and without excessive labor; and by agitating all of the cream, a greater quantity of butter is produced.

In the annexed diagram, A represents the box-churn, with the curved ends K K.

The churn is made of wood, with curved ends, produced by staves fitted into grooves in the sides of the box. The box is about three feet long and fifteen inches wide, and eighteen inches high at the cover, which is two or three inches higher than at the ends. Thick cream is apt to lodge in the corners of a square box, and to obviate this the box is made with a curved end; or it may be made with three boards, so that the cream will slide up an inclined plane instead of coming against a right angle.

Figure 1:
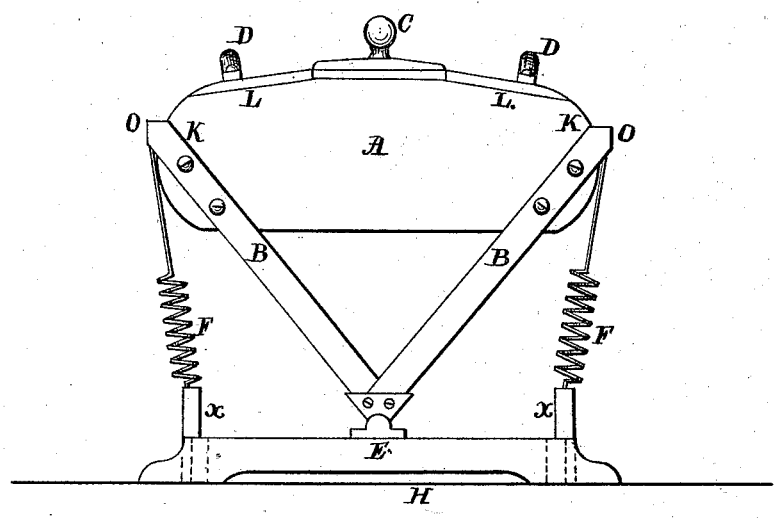
Figure 2:
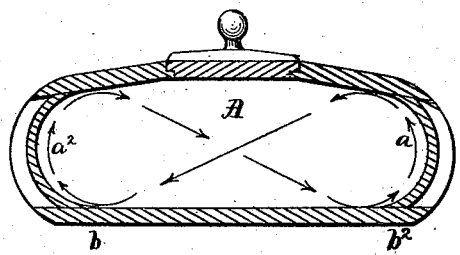

In rocking the churn on the pivot E the cream rushes to one end, and, sliding along the curve, is thrown over, and strikes near the opposite end of the box, as shown by the arrows in Fig. 2. The cream passes around the curved end at $a$, and strikes the bottom of the box at $b$, then to $a^2$, and thence to $b^2$, and back to $a$. The joint $b$ being beyond the center of motion, the force of the cream aids the reverse motion of the churn; and the curved ends and the top being higher at the cover C than at the handles D D, facilitates the motion of the cream without so much friction as to break the grain and injure the quality of the butter. The beveled top L L also allows a better access to the churn in examining and taking care of the cream and butter.

F F represent spiral springs, made of steel, and attached to posts of wood $x$ $x$ about one foot high, and the other end connected by a string or cord to a cleat, $s$, across the end of the churn at $o$ $o$. The braces B B are firmly screwed to the box, and fastened with screws to a metallic joint, which turns at the point E.

The churn is operated by taking hold of one of the handles D, and moving it back and forth.

H is a frame, on which the pivot E rests.

It will be observed that the bottom of the churn being flat and its ends curved, and the top being formed with the two upward bevels or inclines L L, connecting with the upper ends of these curves $k$ $k$, the cream, when the churn is oscillated, will slide across on a flat bottom, and then on the curved end; and in passing beyond such curved end the continuous upward incline or bevel L assists the gravitating tendency of the cream quickly to leave such bevel, and in season to take its proper course to the bottom of the opposite curve $k$, and not to ride along the under side of the top of the churn so far as to be deflected, in its fall, abruptly against the center or hollow of the curved end.

The effect of this construction and action is to cause the cream, during the oscillations of the churn, to pursue a continuous regular course, and turn entirely over, or bottom side upward, and vice versa, its route being, in fact, in lines resembling a figure eight, (8,) the resultant effect upon the cream being that it is all churned alike, and a better and more uniform butter is produced, as also a larger quantity from a given amount of cream. The bottom of the churn, being flat, gives it a greater force when it reaches the curved ends than it would if the bottom were round or concave, and thus insures a better action.

The springs F are made of the best steel; and they not only perform the duty of assisting very materially in the oscillations of the churn, and so relieve the attendant of much labor, but their strength is such as to serve as supports for the churn, whether the same is at rest or in action. They also greatly relieve the strain and wear of the pivot or axis at the center of oscillation, while the arms or braces B B not only, in turn, relieve the springs, but they also firmly sustain the box or churn, and insure a uniform and steady support for it.

All floats or irons within the churn are avoided, as also all dashers and everything which could tend to mash the butter-globules. There are no sharp or other corners into which the cream can lodge, to be washed into buttermilk, and lost when the butter separates.

I do not claim a long shallow churn-body, nor one having within it a perforated diaphragm, or other device adapted abruptly to break up the current given to the cream, or to injure the butter-globules; and I do not give to the churn-body a mere rocking motion, as if it were pivoted at the base of the body, but, on the contrary, a wide vibrating or swinging movement from a center quite distant from the body, and which motion, in connection with the particular shape given to the short body and its inclined top pieces, and the fact that there is nothing within the body to interfere with the continuous ∞ motion of the cream, which regularly turns the whole mass upside down, while still pursuing a uniform course of endless travel. The straps which connect the ends of the churn-body with the springs each, in turn, after stretching its spring, serves to pull down, and cause the end to which it is so attached to react at each vibration.

I claim—

1. The churn or chamber A, supported on a vibrating frame, which has its pivotal bearings in a stationary frame, said chamber having no internal appliances to break or interrupt the currents, and having not only a flat bottom and curved ends K K, but also the two upward inclines L L at the top, made continuous with such curved ends, the whole operating to give to the cream a continuous and overturning course, as and for the purposes set forth.

2. In combination with the churn A, having the upward inclines at its top and the curved ends and flat bottom, as shown and described, the supporting frame or braces B B, the base upon which the braces are pivoted and swung, and springs F F, directly connecting the ends of the churn with such bed or base, the whole operating as and for the purposes set forth.

OLIVER W. DAVIS.

Witnesses:
GEO. W. KENNEDY,
H. M. KENNEDY.